US009355031B2

(12) United States Patent
Bayer et al.

(10) Patent No.: US 9,355,031 B2
(45) Date of Patent: May 31, 2016

(54) TECHNIQUES FOR MAPPING DEVICE ADDRESSES TO PHYSICAL MEMORY ADDRESSES

(75) Inventors: Gerd Bayer, Boeblingen (DE); Hannes Hering, Boeblingen (DE); Hoang-Nam Nguyen, Boeblingen (DE); Christoph Raisch, Boeblingen (DE); Jan-Bernd Themann, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 13/452,860

(22) Filed: Apr. 21, 2012

(65) Prior Publication Data

US 2012/0272037 A1 Oct. 25, 2012

(30) Foreign Application Priority Data

Apr. 21, 2011 (EP) ..................................... 11163339

(51) Int. Cl.
*G06F 12/00* (2006.01)
*G06F 12/02* (2006.01)
*G06F 12/10* (2016.01)

(52) U.S. Cl.
CPC ........ *G06F 12/0292* (2013.01); *G06F 12/1081* (2013.01)

(58) Field of Classification Search
None
See application file for complete search history.

(56) References Cited

U.S. PATENT DOCUMENTS

| 6,622,193 | B1 * | 9/2003 | Avery ..................... G06F 13/32 710/22 |
| 7,249,241 | B1 | 7/2007 | Chu et al. |
| 7,487,327 | B1 | 2/2009 | Chang et al. |
| 7,809,923 | B2 | 10/2010 | Hummel et al. |
| 7,849,287 | B2 | 12/2010 | Hummel et al. |
| 2004/0015622 | A1 * | 1/2004 | Avery ............................. 710/22 |
| 2007/0136554 | A1 * | 6/2007 | Biran ................... G06F 12/1081 711/203 |
| 2008/0147925 | A1 | 6/2008 | Brahmaroutu |
| 2008/0270735 | A1 * | 10/2008 | Arndt et al. .................... 711/202 |
| 2008/0294825 | A1 * | 11/2008 | Mahalingam et al. ........ 710/262 |

OTHER PUBLICATIONS

Muli Ben-Yehuda, et al.; "The Price of Safety: Evaluating Iommu Performance"; In OLS '07: The 2007 Ottawa Linux Symposium; pp. 1-13; Jul. 2007 http://www.kemel.org/doc/ols/2007/ols2007v1-pages-9-20.pdf.
Ismoyo Nt; "Guide to I/O Virtualization—The IOMMU"; It Life: AMD; Feb. 22, 2010 http://tommyndut.blogspot.com/2010/02/guide-to-io-virtualization.html.

(Continued)

*Primary Examiner* — Brian Peugh
(74) *Attorney, Agent, or Firm* — Eustace P. Isidore; Yudell Isidore PLLC

(57) ABSTRACT

A data processing system includes a main storage, an input/output memory management unit (IOMMU) coupled to the main storage, a peripheral component interconnect (PCI) device coupled to the IOMMU, and a mapper. The system is configured to allocate an amount of physical memory in the main storage and the IOMMU is configured to provide access to the main storage and to map a PCI address from the PCI device to a physical memory address within the main storage. The mapper is configured to perform a mapping between the allocated amount of physical memory of the main storage and a contiguous PCI address space. The IOMMU is further configured to translate PCI addresses of the contiguous PCI address space to the physical memory address within the main storage.

18 Claims, 3 Drawing Sheets

(56) References Cited

OTHER PUBLICATIONS

Julian Satran, et al.; "Scalable I/O—A Well-Architected Way to Do Scalable, Secure and Virtualized I/O"; IBM Haifa Research Lab, Haifa, Israel; USENIX Association Berkeley, CA, USA © 2008 http://static.usenix.org/event/wiov08/tech/full_papers/satran/satran_html/.

Intel VT-d and AMD IOMMU; "HP Local I/O Technology for Proliant and Bladesystem Servers" © 2007 Hewlett-Packard Development Company, L.P; pp. 1-13; Aug. 2007.

Sang, Fernand Lone, et al.; "Exploiting an I/OMMU Vulnerability"; This paper appears in: Malicious and Unwanted Software (Malware), 2010 5th International Conference; Oct. 19-20, 2010.

* cited by examiner

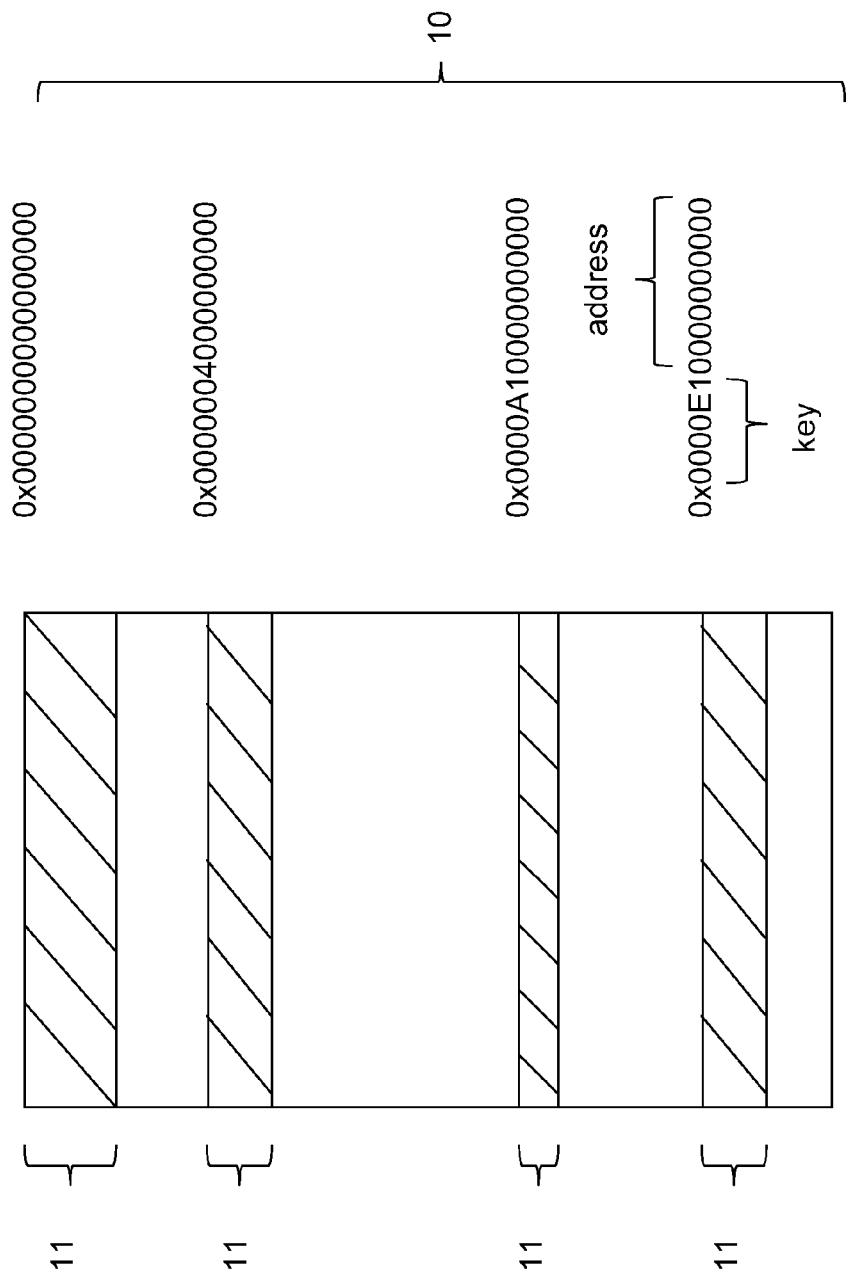

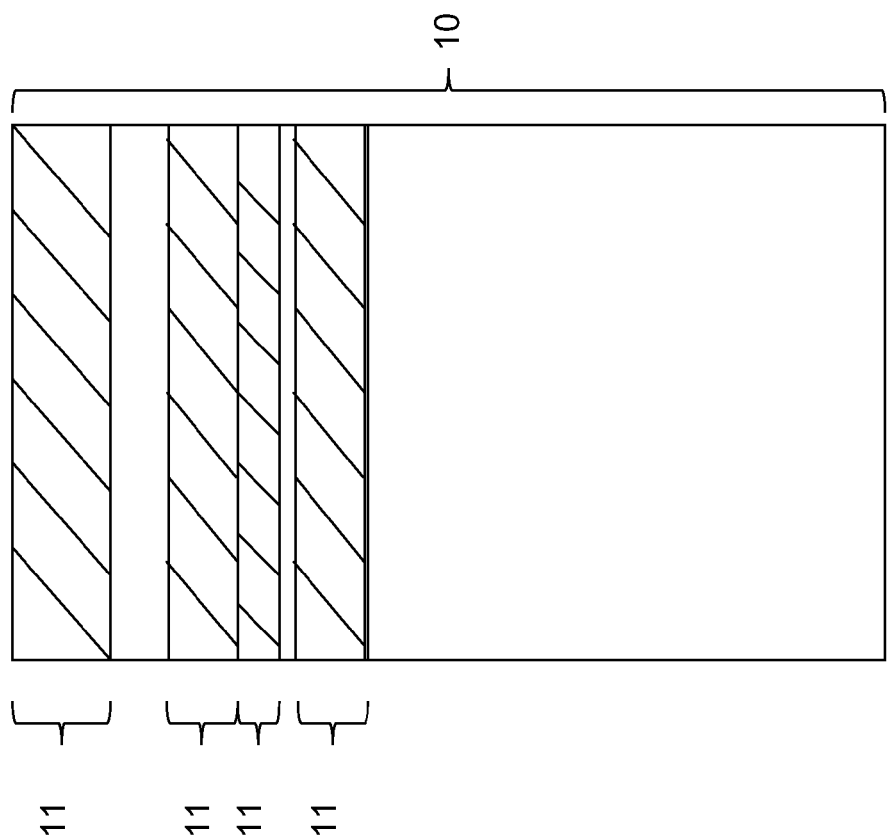

TECHNIQUES FOR MAPPING DEVICE ADDRESSES TO PHYSICAL MEMORY ADDRESSES

This application claims priority to European Patent Application No. EP11163339, entitled "IT-SYSTEM WITH EXTENDED IOMMU TRANSLATION FOR SIMPLIFIED I/O DEVICES," filed Apr. 21, 2011, the disclosure of which is hereby incorporated herein by reference in its entirety.

BACKGROUND

1. Field

The disclosure is generally related to techniques for mapping device addresses to physical memory addresses.

2. Related Art

Information technology (IT) systems frequently include one or more peripheral component interconnect (PCI) devices, e.g., PCI-express devices. Typical PCI devices are external peripheral devices, e.g., external storage devices, network devices, sound devices, etc. PCI devices access physical memory, usually implemented as random access memory (RAM), of an associated IT system using direct memory access (DMA), which provides an efficient way for accessing the memory. The main storage is administered by an operating system (OS) and explicitly provided to be used by the PCI devices.

In order to prevent a PCI device from accessing physical memory that is not assigned to the PCI device, PCI devices typically employ independent PCI addresses. An input/output memory management unit (IOMMU) may be provided for translating PCI addresses into addresses that refer to physical memory. An IOMMU can be implemented on each PCI device or as a central part of an IT system. PCI addresses may be identical to the addresses of underlying physical memory. PCI address space may be provided as a copy of physical memory or an abstraction layer may be provided for protecting main storage from unauthorized access. Typically, a PCI device provides internal device addresses that are used by applications or libraries using the PCI device, such that further address translation is required.

The operation of the IOMMU in address translation involves functionality of the operating system, which selects the physical memory to be used by the PCI device. If a hypervisor is running on the IT system, the hypervisor may also be involved in the IOMMU functionality. An IOMMU may be further configured to perform a plausibility check to restrict access of a PCI device to memory areas of a physical memory that are reserved for the PCI device. In the event a resource identifier (RID) is transmitted from a PCI device to an IOMMU to uniquely identify the PCI device, the IOMMU may verify that the requested PCI address is assigned to the PCI device. The IOMMU may, for example, be implemented in field programmable gate array (FPGA) or an application specific integrated circuit (ASIC).

According to a first approach, an IOMMU may be centrally implemented in an IT system. In this case, a PCI device first performs a translation of a device address to a PCI address and further transmits a request to access memory (based on the PCI address) to the IOMMU. The IOMMU translates (based on a translation table) the PCI address to a physical memory address and grants access to the physical memory. To reduce the size of the required translation table, physical memory can be provided in blocks of a given size and a translation unit can be employed for translating only a part of a PCI address that identifies a respective memory block. In this case, only the mapping for these blocks has to be done, which reduces the size of the mapping table.

According to a second approach, an IOMMU (e.g., in the form of an FPGA or ASIC) may be fully implemented in each PCI device. Using the second approach, in the case of multiple PCI devices, multiple translation layers are implemented. Typically, according to the first approach, an IOMMU only verifies if a PCI device is allowed to access requested memory and the PCI device provides PCI addresses to directly address physical memory. An access to physical memory that is not assigned to a PCI device is detected by an IOMMU, at which point a system has deactivated the entire PCI device. A PCI device may implement a key that facilitates a plausibility check when translating a device address into a PCI address. The key is used internally in the PCI device to distinguish memory areas of different areas of user memory space of the PCI device.

As previously mentioned, a translation unit can be implemented in the PCI device to reduce a size of a mapping table. For example, the translation of the device address to the PCI address can be accomplished by taking a part of the device address, e.g. the upper 52-bits, as a basis for the PCI address in combination with a table driven scheme. The physical memory address can be formed by taking the PCI address and adding a fixed offset for reading and/or writing data.

A disadvantage of the first and second approaches is that addressing errors are handled centrally on the system, which usually results in deactivation of the entire PCI device in the case of an error. For example, an error can occur when a PCI address does not belong to a PCI device. Furthermore, the implementation of the IOMMU and the translation layer is resource consuming, especially if the PCI device is implemented by using FPGAs for the implementation of the IOMMU and the full translation layer is implemented on the PCI device. Moreover, performance of the system is reduced as the translation scheme is rather complicated and not very efficient.

In conventional IT systems, usually both the first and second approaches are combined which results in double consumption of resources and further reduces the performance of the IT systems due to double translation. Accordingly, other applications running on an FPGA are limited to remaining resources, e.g., on-chip memory of the FPGA.

SUMMARY

A data processing system includes a main storage, an input/output memory management unit (IOMMU) coupled to the main storage, a peripheral component interconnect (PCI) device coupled to the IOMMU, and a mapper. The system is configured to allocate an amount of physical memory in the main storage and the IOMMU is configured to provide access to the main storage and to map a PCI address from the PCI device to a physical memory address within the main storage. The mapper is configured to perform a mapping between the allocated amount of physical memory of the main storage and a contiguous PCI address space. The IOMMU is further configured to translate PCI addresses of the contiguous PCI address space to the physical memory address within the main storage.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

FIG. 2 shows an overview of a sparse memory allocation scheme for PCI address space.

FIG. 3 shows an overview of a contiguous memory allocation scheme for PCI address space.

DETAILED DESCRIPTION

Figure 1:
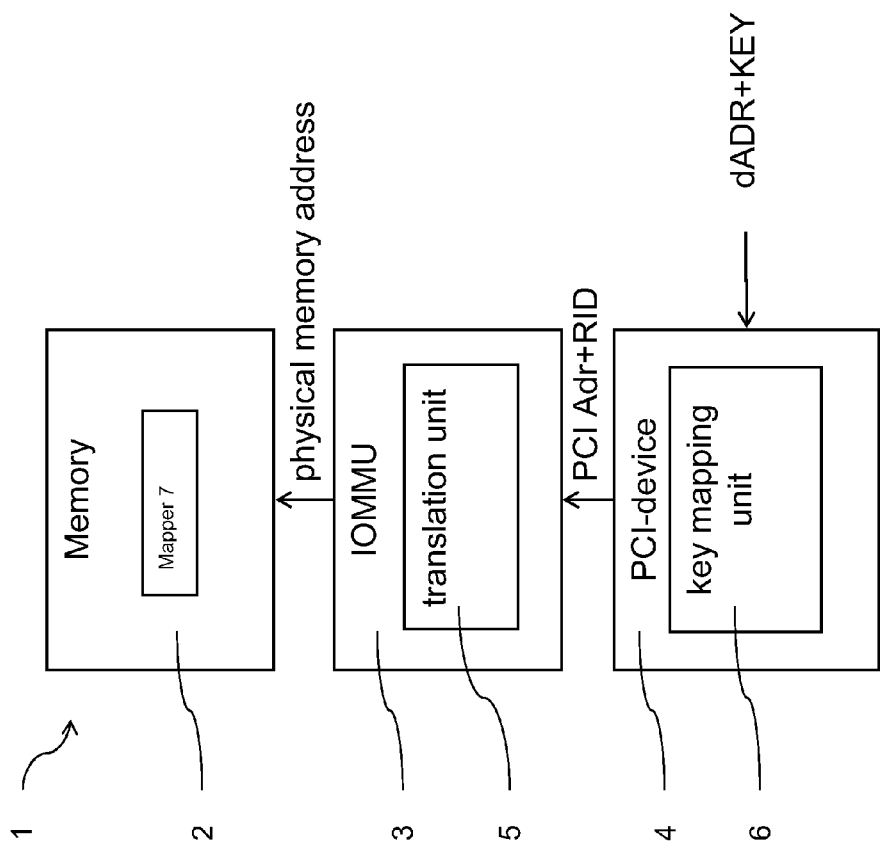
FIG. 1 shows a schematic overview of an information technology (IT) system (data processing system) that includes a main storage, an input/output memory management unit (IOMMU), and a peripheral component interconnect (PCI) device.

As will be appreciated by one of ordinary skill in the art, the present invention may be embodied as a method, system, device, or computer program product. Accordingly, the present invention may take the form of an embodiment including hardware, an embodiment including software (including firmware, resident software, microcode, etc.), or an embodiment combining software and hardware aspects that may all generally be referred to herein as a circuit, module, or system. The present invention may, for example, take the form of a computer program product on a computer-usable storage medium having computer-usable program code, e.g., in the form of one or more design files, embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium include: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. As used herein, the term "coupled" includes a direct electrical connection between elements or blocks and an indirect electrical connection between elements or blocks achieved using one or more intervening elements or blocks.

According to the present disclosure, an IT system that includes a PCI device is disclosed that facilitates improved error handling when accessing physical memory by PCI devices. In general, the disclosed IT systems consume fewer resources than conventional IT systems and exhibit good performance when a PCI device is accessing physical memory. According to one or more embodiments, a system includes a main storage, an IOMMU, and a PCI device. The system is configured to allocate an amount of physical memory in the main storage, and the IOMMU is configured to provide access to the main storage and to map a PCI address from the PCI device to a physical memory address of the main storage.

The system also includes a mapper for mapping between the allocated amount of memory of the main storage and a contiguous PCI address space. In one or more embodiments, the IOMMU is further configured to translate PCI addresses of the contiguous PCI address space to the physical memory address within the main storage. Utilizing contiguous PCI address space results in a simplified addressing scheme, which facilitates implementation of the IOMMU with fewer resources (e.g., IT system resources and PCI device resources). The IOMMU may be implemented as an FPGA (e.g., an FPGA with memory such as SRAM, which can be accessed rapidly and is a usually a limited resource).

The mapper may be implemented by an OS of the system and/or by a driver of the PCI device. In the event a hypervisor is implemented within a system, the hypervisor may entirely or partially implement the mapper. The mapper may be a combined implementation of the OS, the device driver and, if present, the hypervisor. A combined interaction can include: allocating a contiguous memory area of user memory space having a certain length; mapping the user memory space to a contiguous PCI address space of the same length; allocating an amount of physical memory, which is non-contiguous, corresponding to the length of the contiguous memory area of user memory space; and generating a mapping between the physical memory addresses to the contiguous addresses in the PCI address space. The order of the mapping and allocation can be freely chosen.

In at least one embodiment, a system is configured to allocate the physical memory in the main storage in memory blocks. The implementation of memory blocks reduces the size of a required translation table, such that resource consumption is further reduced. In this case, only an address part that corresponds to the identification of a memory block has to be translated. An implementation can be realized by a translation unit, which forms part of the IOMMU. In one or more embodiments, a system is configured to allocate physical memory in main storage in memory blocks of different block sizes. The block size can vary from application to application requesting memory for the PCI device or within the memory assigned depending on a single application request for assigning memory.

Block sizes can also be unique for each PCI device and different PCI devices may employ different block sizes. A system may be configured to apply a block size as a power of two, e.g., 4 kB block sizes. Employing power of two block sizes are best used in a binary system and allow for the addressing of the physical memory in an efficient way. According to at least one embodiment, the IOMMU is configured to translate the PCI address to the physical memory address by combining a first address part of the PCI address (that refers to the memory block of the physical memory address) and a second address part of the PCI address (that refers to a memory unit within the memory block). This allows accessing the physical memory rapidly, because each block can be addressed by translation of the first address part and the remainder of the address can be taken directly from the PCI address to identify the memory address within the memory block. That is, the memory address within the block and the second part of the PCI address directly correspond to each other.

According to another embodiment, a PCI device is configured to internally use a device memory address. In this embodiment, the PCI device includes a mapping unit that is configured to translate the device memory address to the PCI address. The mapping unit provides an implementation within the PCI device that allows a two-stage mapping from the device address to the physical memory address. The mapping unit represents a second, independent stage for accessing the physical memory and may include an error checking unit. Accordingly, errors can be already handled within the PCI device, so that in case of error the PCI device will not be entirely disabled.

In one or more embodiments, a PCI device is configured to provide internally individual memory areas to be addressed by the device memory address. In this case, the mapping unit has a key assigned to each individual memory area and is configured only to translate the device memory address into the PCI address when the device memory address is provided with the key assigned to the memory area containing the device memory address. The mapping unit in this case may be referred to as key mapping unit. The key facilitates verifying if an access to the memory address indicated by the device address is authorized. In the event that the provided key does not match the key assigned to the respective device memory address, access is not granted.

A mapping unit, in addition to restricting memory access, may implement error handling for a PCI device and an application requesting the memory access. The mapping unit may be configured to map the device memory address to the PCI address by adding an offset to the device memory address. In this case, translation of the device address to the PCI address can be readily calculated. The mapping unit may be configured to add a key dependent offset. This facilitates adding key dependent offsets, such that PCI address can be formed depending on used keys in an efficient manner. For example, a mapping unit may be configured to map a device memory address to a PCI address by bit-shifting a device memory address according to a power of a given block size. When memory is allocated in memory blocks, bit-shifting may be performed based on the block size, so that translation of a device address to a PCI address can be performed efficiently. For example, a power of a given block size may define the number of bits to be shifted.

A PCI device driver may be configured to set up the mapping unit. As a PCI device driver is usually provided with the PCI device, the PCI device driver can perform PCI device setup under consideration of particular needs of the PCI device. In one embodiment, a mapper is configured to allocate separate contiguous areas of PCI memory within the contiguous PCI address space for application requests. The separate areas are provided within the contiguous PCI address space spaced apart from each other. This separate contiguous area allocation provides a so-called sparse allocation of the memory within the PCI address space.

Provisioning of unused memory areas within a PCI address space facilitates a dynamic memory allocation for different applications, since the amount of allocated memory can be easily modified. For example, when additional memory is requested by an application, the memory can be added within an unused memory area following an already allocated memory area so that fragmentation of memory allocated for a single application can be avoided. This approach simplifies the access to the PCI address space based on the device address. The separate contiguous areas of a PCI memory can be spaced apart with a predefined distance, or the distance can be calculated dynamically, e.g. under consideration of constraints for the requesting application. In general, the chosen distance is based on the amount of memory typically requested by an application.

A PCI device may be configured to provide an IOMMU with a PCI address together with a resource identifier that identifies the PCI device and is typically unique for each PCI device. The resource identifier enables a plausibility check within an IOMMU. That is, an IOMMU can use the resource identifier to verify if a PCI device is attempting to access a memory that is assigned to the PCI device.

With reference to FIG. 1, an exemplary IT system (data processing system) 1 includes a main storage (memory) 2, an I/O memory mapping unit (IOMMU) 3, and a PCI device 4. Main storage 2 provides an amount of physical memory (usually as random access memory (RAM)) within IT system 1. Main storage 2 is illustrated as storing a mapper 7, which is further described below. Since the amount of available RAM is usually smaller than the address space for the physical memory, parts of main storage 2 can also be provided on a hard disk drive or other storage and be swapped between RAM and the hard disk drive. IOMMU 3 is provided to perform a translation of a PCI address to a physical memory address for accessing main storage 2. IOMMU 3 may, for example, be implemented in an FPGA or an ASIC.

IOMMU 3 includes a translation unit 5 for translating a PCI address from PCI address space 10 (see FIGS. 2 and 3) to a physical memory address based on memory blocks of a given size (e.g., 4 kB). PCI device 4 can be any kind of logical and/or physical device known in the art. PCI device 4 can be used by any kind of resources (e.g., by libraries or applications) of IT system 1. The applications and/or libraries can run directly on an operating system of IT system 1 or can run within a hypervisor within a virtual environment. In one or more embodiments, PCI device 4 includes a key mapping unit 6 that performs a mapping of device addresses (used internally by PCI device 4) to PCI addresses for accessing physical memory via IOMMU 3.

By a way of example, the processes implemented in IT system 1 are described based on a single application running on IT system 1. With reference to FIG. 3, an application initiates use of PCI device 4 by issuing an application request to allocate user memory for use by the application with respect to PCI device 4. A device driver (not explicitly shown) of PCI device 4 receives the application request and allocates a contiguous area of user space 11 with a given length according to the application request. A corresponding amount of memory is then allocated within a contiguous PCI address space 10 by the device driver. The allocated amount of PCI memory corresponds to the allocated memory of user space 11.

The device driver further sets up key mapping unit 6 and assigns a key to the memory allocated due to the application request. The key is also transmitted to the application for accessing the allocated memory. The device driver further initiates the operating system to allocate the required amount of physical memory. The physical memory of main storage 2 is allocated in memory blocks of size (e.g., 4 kB), which is usually not contiguous since main storage 2 is shared by all components of IT system 1. In one or more embodiments, an operating system includes a mapper (not explicitly shown in the figures), which provided a mapping of the non-contiguous physical memory to contiguous addresses in PCI address space 10.

The device driver selects addresses within the area assigned by the operating system and sets up translation unit 5 according to the provided mapping. Application access to main storage 2 is performed using the device address and the assigned key. In one or more embodiments, key mapping unit 6 verifies if the device address corresponds to the key to determine whether the application is authorized to execute the requested memory access. When a mismatch between the provided key and the key stored in key mapping unit 6 occurs, the access to the memory is rejected and the translation is not performed. In this case, a feedback message is provided to the application so that error handling can be initiated.

In the event the keys match, it is verified whether the provided device address lies inside the allocated amount of memory for the application. Since user space 11 is contiguous, the verification includes a check of whether the device address is bigger than the length of the requested memory. As previously mentioned, the physical memory may be allocated in blocks of 4 kB, which corresponds to a number of $2^{12}$ memory cells or bytes. In one or more embodiments, a length L of user space 11 refers to a value that is based on a power of two, e.g., $L=2^m$. In this case, verification includes checking whether the device address is bigger than $2^{m+12}$, in which case the translation is rejected.

Next, key mapping unit 6 calculates the PCI address based on the device address. The calculation may include taking the device address and adding an offset (e.g., a key dependent offset) and performing a bit-shift (e.g., a key dependent bit-shift). For example, the calculation may be represented as PCI address=device address+offset (key)<<12. The above calculations are all based on the key, which has been assigned to the allocated user memory of user space 11.

Key mapping unit 6 may employ a data structure that includes all items required to perform a calculation. For example, the data structure may be an array that includes all entries for the different keys (with a key provided by an application being used as selector to access different entries in the data structure). For example, key mapping unit 6 may be implemented within an FPGA with entries of the data structure being stored in SRAM of the FPGA to allows relatively fast access. In the event that available SRAM of the FPGA is not sufficient for all entries of the data structure, various known update mechanisms may be used for swapping memory from the SRAM to main storage 2.

In one or more embodiments, after calculating the PCI address, PCI device 4 transmits the PCI address together with a resource identifier, which is assigned to PCI device 4, to IOMMU 3. IOMMU 3 performs a verification of the resource identifier so that PCI device 4 can only access physical memory which has been assigned to PCI device 4. Furthermore, translation unit 5 performs a translation of the PCI address under consideration of the block size of allocated physical memory. Accordingly, translation unit 5 first takes an upper address part of the PCI address and performs a mapping of the upper address part to the respective memory block within main storage 2. The remaining part of the PCI address refers to the address of the memory to be accessed within an already identified memory block and can therefore be used directly for accessing the respective memory unit within the memory block.

When additional applications or libraries want to use PCI device 4, additional memory is required. As shown in FIG. 2, multiple user spaces 11 are allocated within PCI address space 10. FIG. 2 illustrates a so-called sparse allocation of user space 11. According to this sparse allocation, multiple user spaces 11 are allocated within PCI address space 10, with different user spaces 11 being spaced apart from each other. Accordingly, when an application requires further memory, the memory can be appended immediately at the end of an already allocated user space 11 to reduce or avoid fragmentation. The memory address within the PCI address space is calculated by combining an upper address part, denoted "key" in FIG. 2, which is characteristic for a particular user space 11, and a lower address part, denoted "address" in FIG. 2, which corresponds to the device address. Accordingly, the application will not be aware of the sparse allocation of its associated allocated user space 11 within PCI address space 10.

In another embodiment, sparse allocation of user memory may be omitted, which results in a memory usage of PCI address space 10 as shown in FIG. 3. As above, an application will not be aware of the allocation of its allocated user space 11 within PCI address space 10. Addressing may be accomplished as described above since the placement of user space 11 is transparent.

In another embodiment, physical memory is allocated directly and mapped to PCI address space. Accordingly, translation unit 5 and key mapping unit 6 are implemented without the handling of memory blocks. In this case, translation unit 5 performs direct translation of the entire PCI address to the physical memory address to be accessed. Moreover, key mapping unit 6 performs the check of the device address by merely comparing whether the device address is bigger than the size of allocated user space 11. In the event the device address is bigger than the size of allocated user space 11, a translation of the device address is rejected. Additionally, the calculation of the PCI address based on the device address is performed by merely adding the offset to the device address.

Accordingly, a data processing system has been disclosed herein that advantageously utilizes contiguous PCI address space to facilitate a simplified addressing scheme.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," (and similar terms, such as includes, including, has, having, etc.) are open-ended when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A data processing system comprising:
   a main storage;
   an input/output memory management unit (IOMMU) coupled to the main storage;
   a peripheral component interconnect (PCI) device coupled to the IOMMU, wherein the system is configured to allocate an amount of physical memory in the main storage and the IOMMU is configured to provide access to the main storage and to map a PCI address from the PCI device to a physical memory address within the main storage; and
   an operating system executing within the data processing system and that includes a mapper configured to perform a mapping between the allocated amount of physical memory of the main storage and a contiguous PCI address space, wherein the IOMMU is further configured to translate PCI addresses of the contiguous PCI address space to the physical memory address within the main storage;
   wherein the IOMMU is configured to translate the PCI address to the physical memory address by combining a first address part of the PCI address referring to a memory block of the physical memory address and a second address part of the PCI address referring to a memory unit within the memory block.

2. The data processing system of claim 1, wherein the data processing system is configured to allocate the physical memory in the main storage in memory blocks.

3. The data processing system of claim 2, wherein the memory blocks have different block sizes.

4. The data processing system of claim 1, wherein the data processing system is configured to apply a block size with a power of two.

5. The data processing system of claim 4, wherein the block size is 4 kB.

6. The data processing system of claim 1, wherein the PCI device is configured to internally use a device memory address and includes a mapping unit that is configured to translate the device memory address to the PCI address.

7. The data processing system of claim 6, wherein the PCI device is configured to provide internal individual memory areas to be addressed by the device memory address and the mapping unit has a key assigned to each individual memory area and is configured only to translate the device memory address into the PCI address if the device memory address is provided with the key assigned to the memory area that includes the device memory address.

8. The data processing system of claim 7, wherein the mapping unit is configured to translate the device memory address to the PCI address by adding an offset to the device memory address.

9. The data processing system of claim 8, wherein the offset depends on the key.

10. The data processing system of claim 8, wherein the mapping unit is configured to map the device memory address to the PCI address under application of bit-shifting of the device memory address according to a power of a given block size.

11. The data processing system of claim 6, wherein a PCI device driver associated with the PCI device is configured to setup the mapping unit.

12. The data processing system of claim 1, wherein the mapper is configured to allocate separate contiguous areas of PCI memory within the contiguous PCI address space for application requests, and wherein the separate areas are provided within the contiguous PCI address space spaced apart from each other.

13. The data processing system of claim 1, wherein the PCI device is configured to provide the PCI address to the IOMMU together with a resource identifier identifying the PCI device.

14. A data processing system, comprising:
    an input/output memory management unit (IOMMU) coupled to a main storage;
    a peripheral component interconnect (PCI) device coupled to the IOMMU, wherein the system is configured to allocate an amount of physical memory in the main storage and the IOMMU is configured to provide access to the main storage and to map a PCI address from the PCI device to a physical memory address within the main storage; and
    an operating system executing within the data processing system and that includes a mapper configured to perform a mapping between the allocated amount of physical memory of the main storage and a contiguous PCI address space, wherein the mapper is configured to allocate separate contiguous areas of PCI memory within the contiguous PCI address space for application requests, and wherein the IOMMU is further configured to translate PCI addresses of the contiguous PCI address space to the physical memory address within the main storage; and
    wherein the IOMMU is configured to translate the PCI address to the physical memory address by combining a first address part of the PCI address referring to a memory block of the physical memory address and a second address part of the PCI address referring to a memory unit within the memory block.

15. The data processing system of claim 14, wherein the PCI device is configured to internally use a device memory address and includes a mapping unit that is configured to translate the device memory address to the PCI address.

16. The data processing system of claim 15, wherein the PCI device is configured to provide internal individual memory areas to be addressed by the device memory address and the mapping unit has a key assigned to each individual memory area and is configured only to translate the device memory address into the PCI address if the device memory address is provided with the key assigned to the memory area that includes the device memory address.

17. A method of accessing physical memory, the method comprising:
    mapping, using an input/output memory management unit (IOMMU), a peripheral component interconnect (PCI) address from a PCI device to a physical memory address within main storage;
    mapping, using a mapper, between an allocated amount of physical memory of the main storage and a contiguous PCI address space, the mapper being located within an operating system of a data processing system and executed by the data processing system; and
    translating, using the IOMMU, PCI addresses of the contiguous PCI address space to a physical memory address within the main storage;
    wherein the IOMMU is configured to translate the PCI address to the physical memory address by combining a first address part of the PCI address referring to a memory block of the physical memory address and a second address part of the PCI address referring to a memory unit within the memory block.

18. The method of claim 17, wherein the PCI device is configured to internally use a device memory address and the method further comprises:

translating, using a mapping unit of the PCI device, the device memory address to the PCI address.

* * * * *